No. 870,942. PATENTED NOV. 12, 1907.
G. F. DUNN.
VAMP FOLDING MACHINE.
APPLICATION FILED SEPT. 28, 1903.
5 SHEETS—SHEET 1.
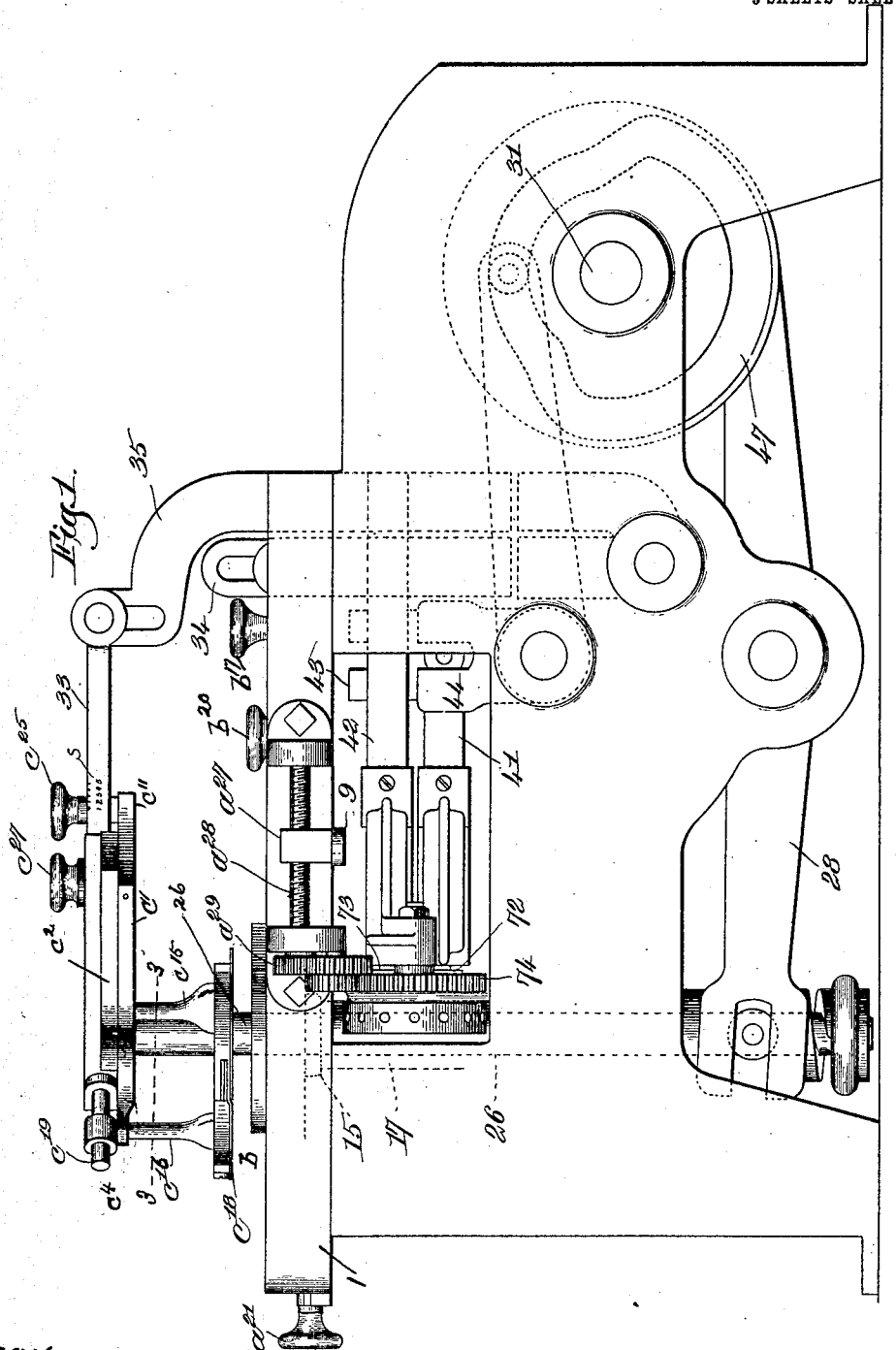

No. 870,942. PATENTED NOV. 12, 1907.
G. F. DUNN.
VAMP FOLDING MACHINE.
APPLICATION FILED SEPT. 28, 1903.
5 SHEETS—SHEET 2.
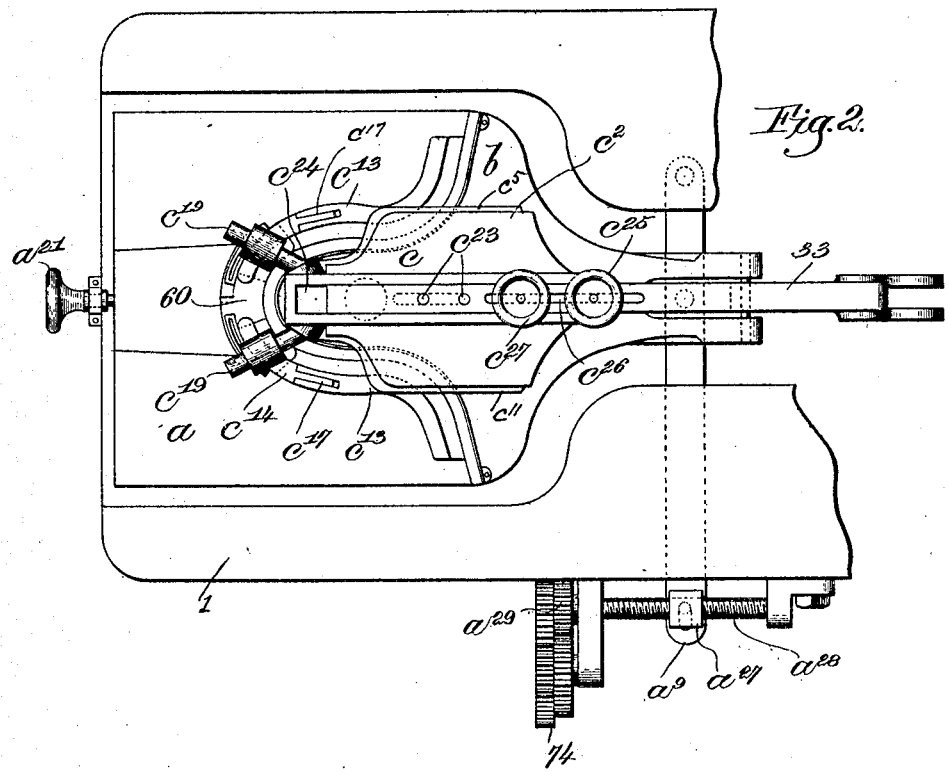
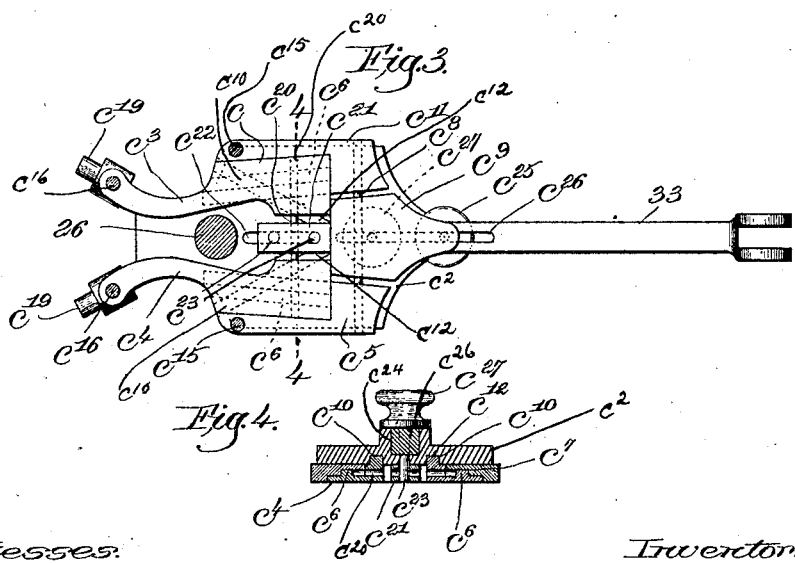
Witnesses:
Thomas J. Drummond
Warren D. Owen
Inventor.
George F. Dunn,
by Crosby Gregory. Attys.

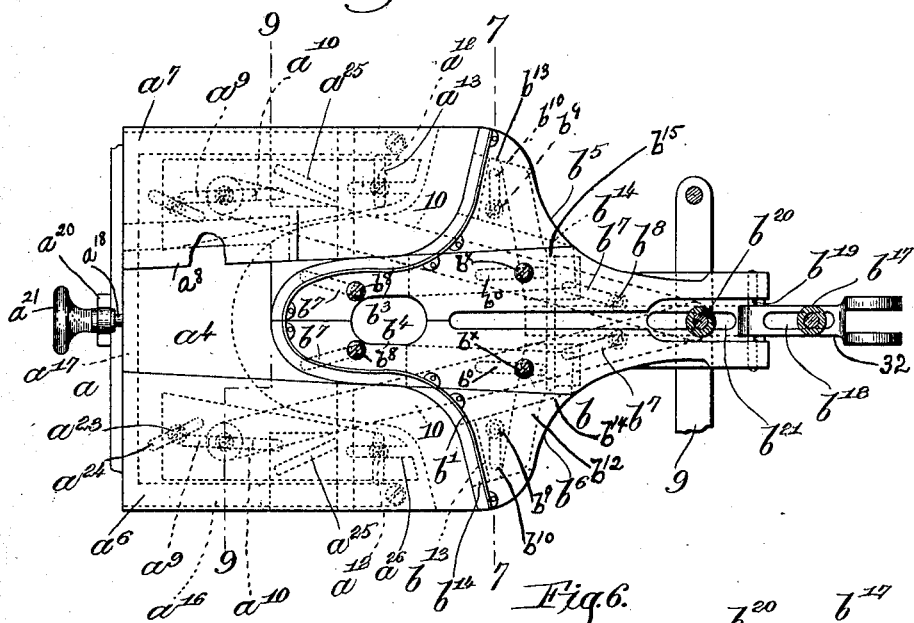
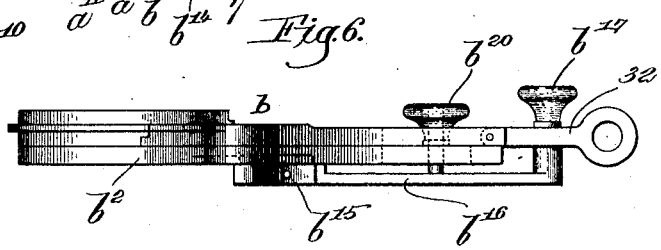
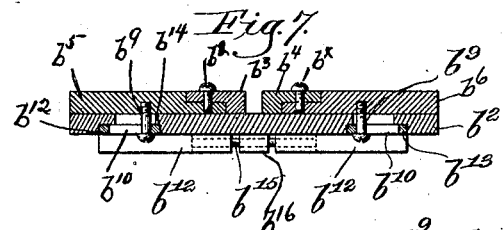
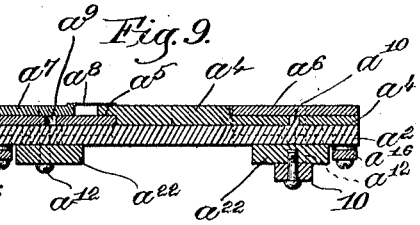

No. 870,942. PATENTED NOV. 12, 1907.
G. F. DUNN.
VAMP FOLDING MACHINE.
APPLICATION FILED SEPT. 28, 1903.
5 SHEETS—SHEET 4.
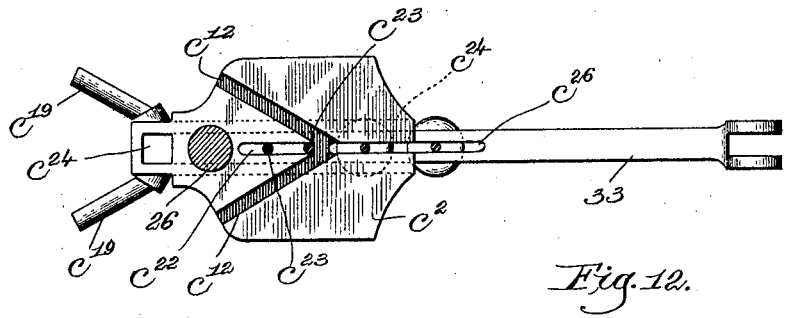
Witnesses.
Thomas J. Drummond.
S. Wm. Lutton.
Inventor.
George F. Dunn,
by Crosby Gregory
Attys.

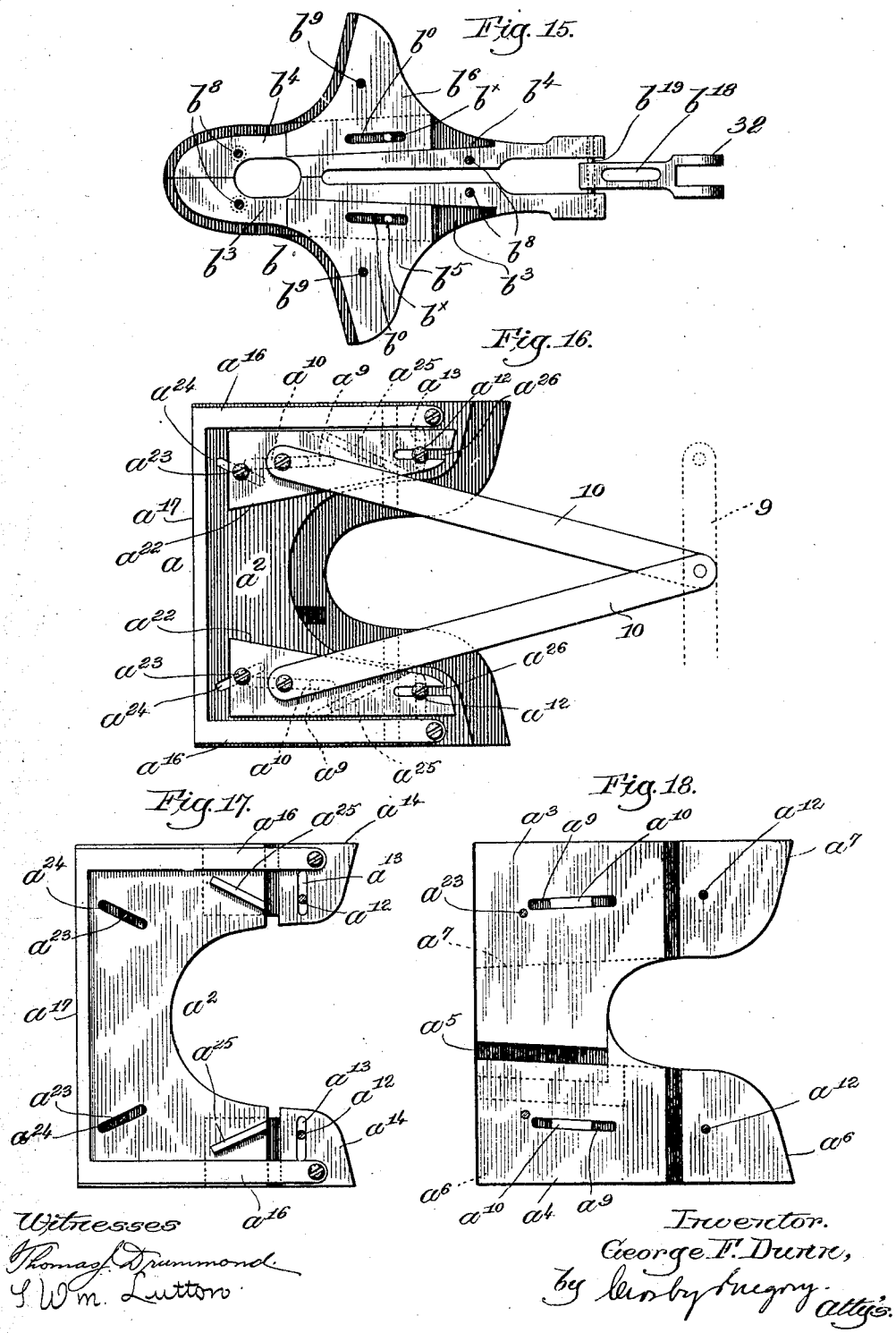

UNITED STATES PATENT OFFICE.

GEORGE F. DUNN, OF BROCKTON, MASSACHUSETTS, ASSIGNOR, BY MESNE ASSIGNMENTS, TO BOSTON MACHINE WORKS COMPANY, OF BOSTON, MASSACHUSETTS, A CORPORATION OF MASSACHUSETTS.

VAMP-FOLDING MACHINE.

No. 870,942.

Specification of Letters Patent.

Patented Nov. 12, 1907.

Application filed September 28, 1903. Serial No. 174,843.

*To all whom it may concern:*

Be it known that I, GEORGE F. DUNN, a citizen of the United States, and residing at Brockton, in the county of Plymouth, State of Massachusetts, have invented an Improvement in Vamp-Folding Machines, of which the following description, in connection with the accompanying drawings, is a specification, like letters on the drawings representing like parts.

My present invention is a vamp folding machine being an improvement on the machine shown in my Patent No. 677,404 and has for its object the provision of means enabling the machine to fold different styles of vamps.

For clearly presenting my present invention I have illustrated the same for folding circular vamps such as are common for women's shoes.

In my machine above mentioned the work-supporting table was adjustable for width only and the folders and formers were similarly restricted in their adjustment, thereby enabling the machine to fold vamps with straight sides and hence having a restricted field of usefulness.

In my present invention I provide automatic adjustment for lengthening and separating the coöperating folding means and a separate adjustment for independently lengthening without separating said folding means, thus accommodating the machine to all the requirements for folding circular vamps of all sizes and widths.

The constructional details and further advantages of my invention will be pointed out in the course of the following description, reference being had to the accompanying drawings in which I have illustrated one embodiment of the invention.

In the drawings, Figure 1 shows in side elevation sufficient details of the machine to enable my embodiment to be understood. Figs. 2, 3, and 4 are views in top plan, inverted horizontal section, and vertical section respectively, of the former, Fig. 3 being taken on the line 3—3, Fig. 1 and Fig. 4 on the line 4—4, Fig. 3. Figs. 5 to 9 are views of the supporting table and folding blades, Fig. 5 being an assembled view in top plan partly in section and broken away for convenience, Fig. 6 an edge view or side elevation of the folding mechanism, Fig. 7 a transverse vertical sectional view on the line 7—7, Fig. 5, Fig. 8 a side elevation of the forward portions of Fig. 5, and Fig. 9 a vertical sectional view on the line 9—9, Fig. 5. Figs. 10 to 13 are views in detail of the former, Fig. 10 being a bottom plan view of the top plate thereof, Fig. 11 being a top plan view with the top plate removed, Fig. 12 being a bottom plan view of the upper member shown in Fig. 11, and Fig. 13 being a top plan view of the forward members. Figs. 14 and 15 are bottom plan views of the folder, Fig. 15 showing the under portions removed. Figs. 16—18 are bottom plan views of the table, Fig. 16 showing all the parts in position, Fig. 17 being a detail of the base plate, and Fig. 18 showing the top plates.

The frame and bed 1, drive shaft 31, gear 47, levers 28, 34, 35, 43, 44, gear 74, pinions, bars 41, 42 and connected parts for driving the same may be and preferably are the same as shown and similarly lettered in the before mentioned patent.

Mounted on the bed 1 is a bed-piece or work-supporting table $a$, having the proper curvature at its rear end, consisting of a U-shaped recess with outwardly curved ends, to suit the vamp, and within this rear end operates a folder $b$ (as shown in Fig. 5) and above the latter and coöperating therewith a former $c$, shown best in Figs. 1 and 2, said folder and former both being correspondingly shaped. The vamp blank is placed on the table $a$ with its forward edges against a gage $b'$ carried on the folder, whereupon the former $c$ descends into folding engagement with the blank and then the folder rises so as to bend upwardly the edges of the blank and then expands forwardly and laterally thereby inturning or pushing forward and outwardly the previously upturned edge of the blank, the former thereupon rising slightly and expanding outwardly from beneath the overturned edges of the blank to permit the folder to descend with a creasing pressure upon the infolded edges of the blank and complete the folding of the vamp.

The former comprises a frame composed of a base $c'$ and a top plate $c^2$, Fig. 2, said base being herein shown as comprising forward members $c^3$, $c^4$ and rear side pieces $c''$, $c^5$ mounted to slide divergently with relation to said forward members by reason of rearwardly diverging ribs $c^6$ on the latter see Figs. 3, 4, and 13 occupying grooves $c^7$ in the side pieces, (Fig. 12) the latter being caused to operate together by a pin $c^8$ held in a block $c^9$ and loose in the side pieces.

The forward members $c^3$, $c^4$, are provided on their upper surface with ribs $c^{10}$ occupying grooves $c^{12}$ in the top plate $c^2$, said ribs and grooves diverging forwardly so that as the base is moved forwardly its parts are caused to separate with relation to the top plate, the latter being held immovably on the upper end of the stem 26.

The forming blades depend from the base the same as shown in my patent but instead of being straight, they are each S-shaped (by which I mean U-shaped with outwardly curved ends) to correspond to the contour of a circular vamp and instead of being made each in one piece, each side piece carries a rear portion $c^{13}$ and the forward members each carry a front portion $c^{14}$ mounted respectively on posts $c^{15}$, $c^{16}$ and slidingly connected as indicated at $c^{17}$.

The thin metal forming portion of the blade is overlapped as indicated at $c^{18}$, Fig. 1, the forward members being guided on flaring pins or other suitable guides $c^{19}$. The reason for the latter construction is to provide the former with a skeleton construction having vertical openings as is clearly seen in Figs. 2 and 3 so that the operator can see within the same just how the vamp is being manipulated, this being of great practical advantage for rapid folding.

The forward members $c^3$, $c^4$ are connected by a pin $c^{20}$ the same as previously described for the rear pieces in connection with the pin $c^8$, the pin $c^{20}$ being mounted in a block $c^{21}$ arranged to slide longitudinally in a slot $c^{22}$ in the top plate and held by pins $c^{23}$ to a link or slide-rod 33 mounted to reciprocate in a way $c^{24}$ provided on the upper side of the top plate. The rear members or side pieces $c''$, $c^5$ and their block $c^9$ are normally clamped to the slide-rod 33 by means of a hand wheel $c^{25}$ mounted in a slot $c^{26}$, and in said block $c^9$ is also mounted a second hand wheel $c^{27}$ which spans across the sides of way $c^{24}$ Fig. 4. By loosening the hand wheel $c^{25}$ and tightening the hand wheel $c^{27}$ forward movement of the slide-rod 33 will cause the forming blades to expand and also lengthen inasmuch as the side pieces $c''$, $c^5$ are prevented from moving forward by reason of the clamping nut or hand wheel $c^{27}$; and by loosening the wheel $c^{27}$ and tightening the wheel $c^{25}$ the normal movement of the parts will take place and a forward movement of the rod 33 will simultaneously expand but not lengthen the blades. The same movement is provided for the folder $b$, shown in Figs. 5—7, 14 and 15. On a base plate $b^2$ are mounted central top plates or folding blade carriers $b^3$, $b^4$ extending lengthwise along the middle of the folder and lateral plates $b^5$, $b^6$ which have the same movement as already described in connection with the former, two sets of diagonal slots $b^7$ being formed in the base plate to receive pins $b^8$ extending downwardly from the plates $b^3$, $b^4$, the side plates $b^5$, $b^6$ being connected to the carriers $b^3$, $b^4$ by headed pins $b^\times$ in slots $b^0$ and to the bottom plate by pins $b^9$ entering transverse slots $b^{10}$ in connecting pieces $b^{12}$ whose outer ends $b^{13}$ are guided in oblique slots $b^{14}$, formed in the under side of said base plate, said connecting pieces being loosely mounted on a transverse pin $b^{15}$ carried in an adjusting stem $b^{16}$ adapted to be clamped by a nut or hand wheel $b^{17}$ mounted in a slot $b^{18}$ in the slide-rod 32 which is connected by a pin $b^{19}$ to the rear ends of the pieces $b^3$, $b^4$. A second clamping nut or hand wheel $b^{20}$ is mounted in a slot $b^{21}$ in the base plate for clamping the stem $b^{16}$ to said base plate when it is desired to lengthen the pattern. When the nut $b^{17}$ is fast and $b^{20}$ loose the parts expand and contract together and when $b^{17}$ is loose and $b^{20}$ is clamped the pattern is lengthened inasmuch as the side plates $b^5$, $b^6$ are held back when the forward members $b^3$, $b^4$ are moved forward. The vamp supporting table $a$ is also made adjustable longitudinally to correspond to the various adjustments of the former and folder as already described.

On a base plate $a^2$, see Figs. 5, 8, 9, 16 and 17 are mounted the shaped plates comprising back plates $a^3$, $a^4$, the latter overlapping the plate $a^3$ at $a^5$ and cut away at the right hand side to receive a top plate $a^6$, a similar top plate $a^7$ being provided at the opposite side and having a thin extension $a^8$ for covering the gap which would otherwise be exposed and cause the vamp's edges to curl up when the members are spread, as subsequently explained. The top plates $a^6$, $a^7$, are mounted for longitudinal movement on the back plates $a^3$, $a^4$ by means of slots $a^9$ and ribs $a^{10}$, as clearly shown in Figs. 5 9, 16 and 18 the top plates being actuated by pins $a^{12}$, secured thereto and passing down through transverse slots $a^{13}$ in intermediate plates $a^{14}$ Figs. 16 and 17 operated by arms $a^{16}$ connected by a cross bar $a^{17}$ actuated by a screw $a^{18}$ held immovably in a bracket $a^{20}$ on the frame of the machine and operated by a hand wheel $a^{21}$. Turning this hand wheel operates through the arms $a^{16}$ to slide the plates $a^6$, $a^7$ longitudinally for lengthening or shortening the pattern or shape of the supporting plate, and the intermediate plates $a^{14}$ are provided for coöperating with the operating links 10 in causing lateral and longitudinal movement simultaneously, independently of the longitudinal movement which has just been described. This simultaneous expanding and lengthening movement is accomplished through intermediate connections between the links 10 and the shaped plates, said intermediate connections being shown as plates or pieces $a^{22}$ connected to the plates $a^3$, $a^4$ by pins $a^{23}$ passing through divergent slots $a^{24}$ formed in the base plate $a^2$ and being further guided divergently by means of a rib and slot connection $a^{25}$ with said base plate. The pieces $a^{22}$ have longitudinal slots $a^{26}$ at their rear ends engaging the projecting lower ends of the pins $a^{12}$, the result being that as the links 10 move forward to the left, Fig. 5, thereby causing the pieces $a^{22}$ to move diagonally away from each other, the pin and slot connection $a^{12}$, $a^{26}$ with the top pieces $a^6$, $a^7$ causes the latter to spread apart inasmuch as they cannot move forward. The result is that there is a combined lengthening and widening movement. The links 10 are connected to a lever 9, the same as shown in my aforesaid patent, said lever 9 being provided at its outer end with a nut $a^{27}$ mounted on a screw $a^{28}$ driven by a train of gears $a^{29}$ from the main gear 74, thereby providing in connection with the pinions 72, 73 and slides 41, 42 and connected mechanism as set forth in my aforesaid patent, means for simultaneously, by the rotation of the gear 74 adjusting the work support, former and folder.

The coöperative work-supporting table $a$, folder $b$, and former $c$, each constitutes a vamp-edge-engaging device, having a substantially U-shaped working edge with flaring ends, conforming to the recess in a short or circular vamp, said device having sliding sections connected to slide together or in common, and being adjustable in length along the sides or legs of the U; and each may be said to be composed of halves having a working movement toward and from each other, each half being adjustable in length. The connections for making the adjustments of the folder and former contain length-adjusting means, and are arranged to move with said members, following the working movements thereof; the working movement of the folder $b$ being imparted by the reciprocating element 32, which carries the adjustable connection $b^{16}$ and coöperating parts, and the working movement of the former $c$ being imparted by the reciprocating element 33, which carries the adjustable connection at $c^{25}$, $c^{27}$. All three of said coöperative members $a$, $b$, $c$, may be simultaneously adjusted for any given length by properly throwing the gear 74 which operates the mechanism and connections between the slidable sections of the several members or devices a, b, c. As already explained, the folder moves up into the plane of the table-edge for upwardly bending the edge of the vamp and then has an expansive working movement over the table-edge for infolding said vamp-edge, this expansive working movement taking place independently of the table without moving the latter in any respect; the adjusting movement of the table and folder (said table and folder having their sliding sections connected for imparting the contracting adjusting movement of one to the other) being distinct from said regular working or operative movement of the folder for folding vamps.

The operation of the machine according to my invention is as follows: Supposing that the machine happens to be set for a vamp, size eight, four wide and it is desired to change it to fold vamps for the next size, the operator simply turns the gear 74 to correspond to size nine, this movement acting to move lever 9 to the left, Fig. 5, thereby moving back the back plates $a^3$, $a^4$ slightly and at the same time separating top plates $a^6$ and $a^7$ without moving them back, the result being that the space is properly lengthened and widened for size nine, width four. The same movement also causes the folding blades similarly to lengthen and widen and causes the former likewise to lengthen and widen, by moving forward respectively the levers 34, 35 the required distance therefor. If however, instead of getting the next size the operator simply wished to change the width so as to fold size eight, five wide, he would first adjust the machine to the next size, as just stated, thereby getting the desired width five (which is the same as four wide for size nine) and would then turn the hand wheel $a^{21}$ over to the right thereby pulling back and shortening the top-pieces $a^6$, $a^7$ to size eight, and would loosen wheel $b^{17}$ and push wheel $b^{20}$ forward to the left until the folding blades fit against the forward edges of the supporting table and would loosen the two wheels $c^{25}$, $c^{37}$ of the former and push the wheel $c^{27}$ forward to the left until the indicator on wheel $c^{25}$ indicated the correct size on the scale shown at s, Fig. 1.

In practice all is accomplished very quickly, the procedure being to first set the machine for the smallest size and then get all the successive sizes simply by rotating the gear 74, the various widths being obtained by the hand adjustment just explained.

In practice proper indicators and scales are provided on each of the parts.

The machine having been adjusted to the desired size and width, is then operated in the same manner as set forth in my before mentioned patent, the vamp being clamped in place by the former and inturned by the folder, whereupon the former expands so as to get out from beneath the folds, and the folding blades then come down with creasing pressure on the folds, then rise, contract and descend into position for another vamp to be put in place, whereupon the operation is repeated.

It will be understood that I have merely attempted herein to make a general showing of my invention without attempting accuracy in arrangement and proportion of parts and have purposely omitted various details for clearness of illustration and it will also be understood that I do not intend to limit myself to the particular embodiment herein presented, inasmuch as various changes may be resorted to without departing from the spirit and scope of my invention.

Having described my invention, what I claim as new and desire to secure by Letters Patent, is:—

1. In a vamp folding machine, folding and forming mechanism, and means to adjust the same widthwise and lengthwise.

2. In a vamp folding machine, folding and forming mechanism, and means to simultaneously adjust the same widthwise and lengthwise.

3. In a vamp folding machine, coöperating folding members, including a vamp edge engaging device having a substantially U-shaped working edge, conforming to the folded edge of the vamp, the sides of said device being adjustable longitudinally for changing the length of the working edge.

4. In a vamp folding machine, a former, having a substantially U-shaped working edge, conforming to the folded edge of the vamp, said former being longitudinally adjustable along the sides or legs of the U, for conforming to different sizes of vamps.

5. In a vamp folding machine, a folder, having a substantially U-shaped working edge, conforming to the folded edge of the vamp, said former being longitudinally adjustable along the sides or legs of the U, for conforming to different sizes of vamps.

6. In a vamp folding machine, a receiving table having an edge contour corresponding in shape to the folded edge of the vamp, a former adapted to rest on the blank and table and having a forming edge corresponding to the shape of the latter, a folder adapted to operate in the space embraced by said former and table, means to lengthen said former, and means to lengthen said folder.

7. In a vamp folding machine, a receiving table having an edge contour corresponding in shape to the folded edge of the vamp, a former adapted to rest on the blank and table and having a forming edge corresponding to the shape of the latter, a folder adapted to operate in the space embraced by said former and table, and means to simultaneously lengthen and widen said folding means.

8. In a vamp folding machine, a receiving table having an edge contour corresponding in shape to the folded edge of the vamp, a former adapted to rest on the blank and table and having a forming edge corresponding to the shape of the latter, a folder adapted to operate in the space embraced by said former and table, and means to simultaneously lengthen and widen said former.

9. In a vamp folding machine, a receiving table having an edge contour corresponding in shape to the folded edge of the vamp, a former adapted to rest on the blank and table and having a forming edge corresponding to the shape of the latter, a folder adapted to operate in the space embraced by said former and table, and means to simultaneously lengthen and widen said supporting table.

10. In a vamp folding machine, forming mechanism, folding mechanism, and a supporting table having an edge contour corresponding to a folded vamp and composed of a plurality of independent parts having their upper surfaces lying substantially in the same plane, and means for moving certain of said parts for lengthening the table to different sizes of vamps.

11. A vamp folding machine, having a work supporting table made up of a plurality of independent parts, and automatic means for adjusting said parts for different lengths and widths.

12. In a vamp folding machine, a work supporting table having an edge shaped to correspond to a folded vamp, said edge being composed of a plurality of independently movable parts, including longitudinally movable top-pieces for the sides of the vamp and a separate intermediate piece, and hand operated means for independently adjusting said top-pieces.

13. In a vamp folding machine, a former having its forming blades longitudinally adjustable for different sizes of vamps, power mechanism for operating said former, and hand operated mechanism for adjusting said blades longitudinally independently of said power mechanism.

14. In a vamp folding machine, a former provided with forming blades, expansible and longitudinally adjustable, power mechanism for operating said former, means for coupling said blades to said power mechanism for simultaneous expansion and lengthening thereof, and means for coupling said blades to said power mechanism solely for expansion.

15. In a vamp folding machine, a folder having folding blades composed of a plurality of parts arranged for expansion and also for lengthening, power mechanism for operating said parts, and means for coupling said power mechanism thereto for operating said parts for either or both movements as desired.

16. In a vamp folding machine, a work supporting table, having a U-shaped recess with outwardly curved ends for receiving a circular vamp, said table at the sides and ends of said recess being movable with relation to the rest of the table, and means for adjusting the same longitudinally.

17. In a vamp folding machine, a work supporting table, having a U-shaped recess with outwardly curved ends for receiving a circular vamp, said table at the sides and ends of said recess being movable with relation to the rest of the table, and means for adjusting said table laterally for increasing the width of said recess.

18. In a vamp folding machine, a work supporting table having at one end a recess corresponding to the shape of the vamp, said table being composed of a plurality of relatively movable parts for adjusting the table to different vamps, and means for maintaining the receiving surface of said table flat and continuous in all its adjustments adjacent said recess.

19. In a vamp folding machine, a work supporting table having a U-shaped recess with outwardly curved ends for receiving a circular vamp, said table comprising a plurality of independently movable parts including opposite top-plates at the sides of said recess, and means for simultaneously separating said top-plates and moving them lengthwise with relation to the rest of the table.

20. In a vamp folding machine, a folder whose edge conforms to the shape of a circular vamp and comprising central folding blades and laterally extending side blades, independently movable, and means for moving said side blades longitudinally of said central blade.

21. In a vamp folding machine, a folder whose edge conforms to the shape of a circular vamp and comprising central folding blades and laterally extending side blades, independently movable, means for expanding said central and side blades, and means for simultaneously moving said side blades longitudinally.

22. In a vamp folding machine, a former having its forming portions composed of a plurality of independently movable parts shaped internally to correspond to a circular vamp, the rear portions thereof each having an outward forming-curve, and means for moving said rear portions longitudinally of the former.

23. In a vamp folding machine, a former having its forming portions composed of a plurality of independently movable parts shaped internally to correspond to a circular vamp, the rear portions thereof each having an outward forming-curve, and means for moving said rear portions longitudinally of the former independently of the forward-forming portions.

24. In a vamp folding machine, a former having its forming portions composed of a plurality of independently movable parts shaped internally to correspond to a circular vamp, the rear portions thereof each having an outward forming-curve, and means for simultaneously moving said rear portions laterally and longitudinally of the former.

25. In a vamp-folding machine, a vamp-edge-engaging device having a substantially U-shaped working edge with flaring ends, conforming to the recess in a short vamp, said device being adjustable in length along the sides or legs of the U.

26. In a vamp-folding machine, a former having a substantially U-shaped working edge with flaring ends, conforming to the recess in a short vamp, said former being adjustable in length along the sides or legs of the U, and means for folding the edge of the vamp around said former.

27. In a vamp-folding machine, a folder having a substantially U-shaped working edge with flaring ends, conforming to the recess in a short vamp, said folder being adjustable in length along the sides or legs of the U, and a former around which said folder folds the edge of the vamp.

28. In a vamp-folding machine, a vamp-supporting table having a substantially U-shaped working edge with flaring ends, conforming to the recess in a short vamp, said table being adjustable in length along the sides or legs of the U, and means coöperating with said table for folding the edge of the vamp.

29. In a vamp-folding machine, a vamp-edge-engaging device having a substantially U-shaped working edge conforming to the recess in a vamp, said device composed of halves having a working movement toward and from each other, each half being adjustable in length.

30. In a vamp-folding machine, a vamp-edge-engaging member having a working movement and adjustable in length, adjusting connections arranged to follow the working movement of said member, and means operating on said connections for adjusting the length of said member.

31. In a vamp-folding machine, a vamp-edge-engaging member having a working movement and adjustable in length, a reciprocatory element for imparting said working movement, and a device carried by and adjustable on said element and connected to impart said length-adjustment.

32. In a vamp-folding machine, a plurality of vamp-edge-engaging devices coöperating to fold the edge of the vamp and having substantially U-shaped working edges with flaring ends, conforming to the recess in a short vamp, said devices having sliding sections for adjusting them in length, and means connecting said sliding sections in the respective devices for causing the adjusting movements of said sections to occur in common.

33. In a vamp-folding machine, a former, a folder, and a vamp-supporting table, all having sliding sections for varying their length, mechanism connected with the slidable section in one of said devices for adjusting the same, and connections from said section to the slidable sections in the other devices for producing similar adjusting movements in the last-said sections.

34. In a vamp-supporting machine, a vamp-supporting table and a folder, each having an adjustable section, said folder having a working movement over the table edge and a movement into and out of the plane of said table-edge, and a connection between the sliding sections of said folder and table having provisions for imparting the contracting adjusting movement of the folder to the table, and the adjusting movement of the folder-section to the table-section and for permitting the expanding working movement of the folder with respect to the table.

35. In a vamp folding machine, a receiving table having an edge contour corresponding in shape to the folded edge of the vamp, a former adapted to rest on the blank and table and having a forming edge corresponding to the shape of said edge contour, a folder coöperating with said former and table, and adjusting means to lengthen said former.

36. In a vamp folding machine, a receiving table having an edge contour corresponding in shape to the folded edge of the vamp, a former adapted to rest on the blank and table and having a forming edge corresponding to the shape of said edge contour, a folder coöperating with said former and table, and adjusting means to lengthen said folder.

In testimony whereof, I have signed my name to this specification, in the presence of two subscribing witnesses.

GEORGE F. DUNN.

Witnesses:
S. WILLIAM LUTTON,
GEO. H. MAXWELL.